Nov. 15, 1966  J. R. REED  3,285,051

DYNAMIC DISPLACEMENT TRANSDUCER

Filed Oct. 28, 1964

INVENTOR.

JAY R. REED

BY

*J. F. Sheehan*
ATTORNEY

United States Patent Office 3,285,051
Patented Nov. 15, 1966

3,285,051
DYNAMIC DISPLACEMENT TRANSDUCER
Jay R. Reed, Mantua, N.J., assignor to the United States of America as represented by the Secretary of the Navy
Filed Oct. 28, 1964, Ser. No. 407,264
6 Claims. (Cl. 73—1)

The invention described herein may be manufactured and used by or for the Government of the United States of America for governmental purposes without the payment of any royalties thereon or therefor.

This invention relates to the calibration of vibration transducers and is particularly concerned with calibration of such instruments for measurement at low frequencies.

Due to recent advances in machinery noise reduction, a problem exists in the measurement of low level vibrations, particularly of machinery used in naval vessels and has necessitated the calibration of vibration transducers for the measurement of low frequency vibration levels in order to determine the proper operation of such machinery.

It has been customary to calibrate vibration transducers and accelerometers by the comparison principle, that of coupling the instrument to be calibrated to a standard instrument, and during the vibration of the instrument, comparing the output, but this comparison method is satisfactory only in the frequency range of flat response to the standard instrument and has a limited output in the low frequency range.

The present invention concerns what is considered to be a displacement type of apparatus in that the standard for calibrating the vibration transducer transmits a value in accordance with its degree of displacement.

The invention utilizes a strain gage system of known or predetermined sensitivity as the standard. The strain gage system consists of a particular type of mounting for the strain gages and a Wheatstone bridge circuit for producing an output voltage. The mounting is of general U or C shape providing a central portion to which a pair of strain elements are secured and opposed terminal ends which are positioned relative to a shake table or vibratory support in a manner to cause distortion of the strain gage mounting. The shape of the mounting and the manner of supporting it on a vibratory table effect a variation in strain gage resistance in accordance with the vibration of the vibratory mounting. The output of the strain gage system is connected to electrical equipment including a voltage amplifier circuit, filtering circuit and a voltage indicating circuit. The vibration transducer to be calibrated is vibrated in unison with the strain gage mounting and is connected to the electrical equipment in alternation with the strain gage system. The voltage values from the strain gage system and the test transducer to be calibrated are then used to calibrate the sensitivity of the test transducer on the basis of the known sensitivity of the strain gage system.

The principal object of the invention is to provide apparatus for calibrating a vibration transducer.

Another object of the invention is to provide an improved strain gage system for calibrating a vibration transducer.

Another object is to provide calibrating apparatus for vibration transducers which selectively provides an indication of standard voltage output and a test measurement output voltage.

Other objects, advantages and novel features of the invention will become apparent from the following detailed description of the invention when considered in conjunction with the accompanying drawings, wherein.

Figure 1:
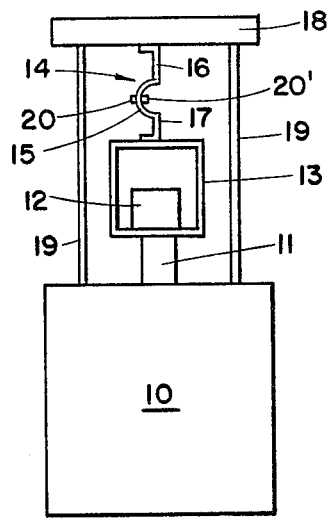
FIGURE 1 is a view in elevation of the calibrating apparatus of the invention.

Referring to FIGURE 1, 10 indicates a support such, for example, as a powered "shake table" having a vibrating head 11 extending through its upper end. The vibration transducer to be calibrated, or test transducer, is indicated at 12 and, as shown, is disposed within a housing 13 which is supported on the vibrating head 11. The housing 13 is shown as having an open end to provide ready access thereto for admitting the transducer 12. The standard for calibrating the transducer 12 consists of a mounting formed of an elongate resilient element indicated generally at 14. The element 14 may for example, be a flat strip of spring steel and have a C-shaped or bowed central section 15 with opposed upper and lower leg portions 16 and 17. The resilient element 14 is located between the housing 13 and a fixed brace 18 which may, as shown, be secured in fixed position to the support 10 by means of rods 19. The upper leg portion 16 is connected to the brace 18 while the lower leg portion 17 is connected to the housing 13 so that the vibrating head 11 will simultaneously vibrate the test transducer 12 to provide a voltage and place the resilient mounting 14 alternately in compression and tension. A pair of strain gages 20 and 20' are mounted on the resilient mounting element 14 at the midpoint of the central portion 15, one being fixed to its concave face and the other being fixed to the convex face. As the mounting element 14 is placed in compression and tension, the strain gage resistance, not shown, will be flexed to vary the resistances in accordance with the vibratory movement of head 11. By positioning the gages as described, the sensitivity of the strain gage area is substantially increased over the use of one gage at the mid portion of the bowed section of the strip 14.

Figure 2:
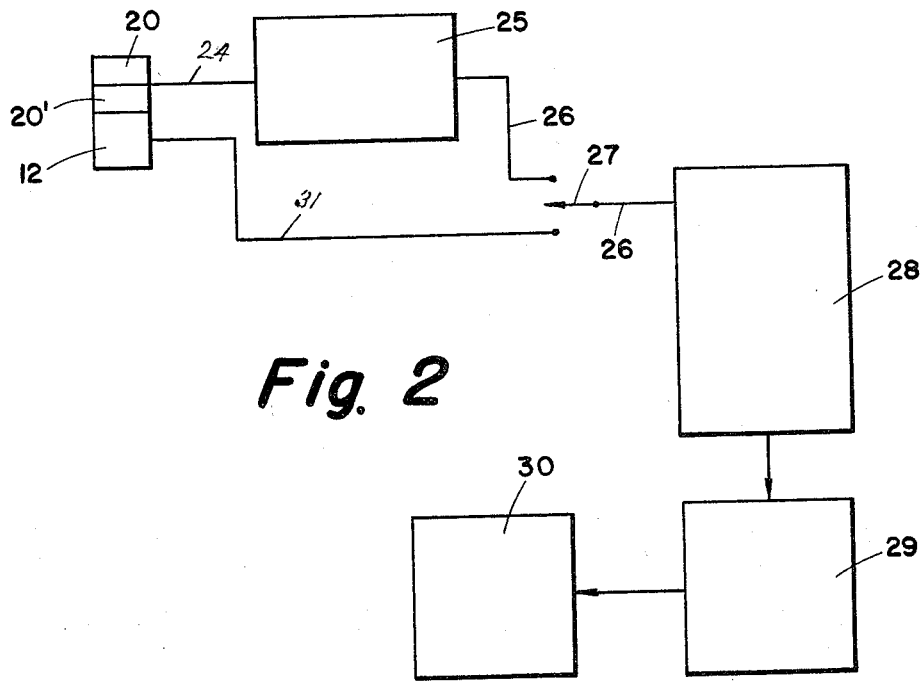
FIGURE 2 is a diagrammatic view showing the arrangement of the electrical equipment used in the invention.

In FIGURE 2 the strain gages 20 and 20' are shown connected by line 24 to voltage developing circuitry indicated at 25. No details of the circuitry is considered necessary to be shown but, for example, various commercial Wheatstone bridge circuits may be used. One such circuit which has been used in practicing this invention was obtained from Ellis Associates of 60 Lincoln Avenue, Pelham, New York. This unit known as a "bridge amplifier meter" has a battery, resistances and amplifier and when the resistance of the strain gages 20 and 20' are connected thereto it forms a Wheatstone bridge circuit for developing the output voltages in accordance with the vibration of the head 11. The combination of the mounting 14, strain gages 20–20' and the "bridge amplifier meter" in effect provide a displacement transducer device for calibrating the test transducer 12. The output voltage from 25 is transmitted by line 26 having a switch arm 27 therein to an amplifier 28 and after amplification the voltage is directed to a vibration analyzer 29 of the type having a band pass filter which transmits selected signal voltages to an indicating volt meter 30.

The voltage developed by the test transducer during the vibratory movement of the head 11 is transmitted by line 31, switch 27 and line 26 to the amplifier 28, filter 29 and indicator 30.

The sensitivity of the transducer 12 is calculated or determined on the basis of the sensitivity of the strain gages 20–20', the voltage values developed by the standard or displacement transducer, formed by the strain gages and the unit 25, and the voltage value developed by the test transducer 12.

Obviously many modifications and variations of the present invention are possible in the light of the above teachings. It is therefore to be understood that, within the scope of the appended claims, the invention may be practiced otherwise than as specifically described.

I claim:

1. Apparatus for calibrating vibration transducers which comprises,
   (a) a base mounting a vibrating head for vertical movement,
   (b) a test transducer supported by the vibrating head,
   (c) a fixed brace disposed above and in spaced relation with the test transducer,
   (d) a resilient mounting disposed between said brace and said transducer,
   (e) said mounting having opposed surfaces which are flexed during movement of said head,
   (f) a first strain gage secured to one opposed surface and a second strain gage secured to the other opposed surface,
   (g) electrical voltage developing means in circuit with said strain gages providing a first votage output in accordance with movement of said vibrating head,
   (b) said test transducer developing a second voltage in accordance with movement of the vibrating head and
   (i) electrical indicating circuitry and switch means for alternately transmitting the first and second voltages thereto from the voltage developing means and the test transducer.

2. Apparatus as in claim 1, further characterized by the resilient mounting having a central bowed portion with one of the opposed surfaces being concave and the other being convex.

3. Apparatus as in claim 1, further characterized by the resilient mounting having its upper end secured to said brace and its lower end positioned relative to the transducer to effect a flexing of the mounting during movement of the vibrator.

4. Apparatus for calibrating vibration transducers which comprises,
   (a) a base having a vibrating head mounted for vertical movement,
   (b) housing structure supported by the head and having a test transducer therein,
   (c) a fixed brace disposed above said housing structure,
   (d) an elongate resilient mounting having its upper end abutting said brace and its lower end abutting said housing,
   (e) said mounting having a bowed section between its ends providing opposed concave and convex surfaces which are flexed during movement of the vibrating head,
   (f) said bowed section having a first strain gage secured to its concave surface and a second strain gage secured to its convex surface,
   (g) electrical voltage developing means in circuit with said strain gages providing a first voltage output in accordance with movement of said vibrating head,
   (h) said test transducer developing a second voltage in accordance with movement of the vibrating head and
   (i) electrical indicating circuitry and switch means for alternately transmitting the first and second voltages thereto from the voltage developing means and the test transducer.

5. Apparatus as in claim 4, further characterized by the resilient mounting having its upper end fixed to the brace and its lower end fixed to the upper end of the housing.

6. Apparatus as in claim 5, further characterized by said base having a plurality of rods extending vertically therefrom and supporting said brace in fixed position above said housing No references cited.

LOUIS R. PRINCE, *Primary Examiner.*